United States Patent [19]

Hofer et al.

[11] Patent Number: 5,019,639

[45] Date of Patent: May 28, 1991

[54] NOVEL EPOXY RESINS

[75] Inventors: Arnold Hofer, Muttenz; Alex Wegmann, Allschwil, both of Switzerland

[73] Assignee: Ciba-Geigy Corporation, Ardsley, N.Y.

[21] Appl. No.: 503,399

[22] Filed: Apr. 2, 1990

[30] Foreign Application Priority Data

Apr. 7, 1987 [CH] Switzerland .......................... 1318/89

[51] Int. Cl.$^5$ ............................................. C08G 59/02
[52] U.S. Cl. ......................................... 528/94; 528/99; 528/102; 528/104; 528/110
[58] Field of Search ..................... 528/94, 93, 99, 102, 528/104, 110

[56] References Cited

U.S. PATENT DOCUMENTS

| | | | |
|---|---|---|---|
| 3,346,532 | 10/1967 | Greene et al. | 528/104 X |
| 3,379,791 | 4/1968 | Larson et al. | 528/104 X |
| 4,446,307 | 5/1984 | Shirk | 528/110 X |
| 4,661,541 | 4/1987 | Batzill et al. | 528/110 X |
| 4,675,373 | 6/1987 | Yatsu et al. | 528/104 X |
| 4,684,701 | 8/1987 | Wang et al. | 528/104 X |
| 4,698,400 | 10/1987 | Kordomenos et al. | 525/450 |
| 4,737,553 | 4/1988 | Gannon et al. | 528/104 X |
| 4,835,225 | 5/1989 | Massingill et al. | 528/104 X |
| 4,885,354 | 12/1989 | Hofer et al. | 528/94 |

*Primary Examiner*—Earl Nielsen
*Attorney, Agent, or Firm*—JoAnn Villamizar

[57] ABSTRACT

Advanced epoxy resins are disclosed which can be obtained by reacting liquid or semi-solid aromatic opoxy resins with aliphatic diols, and subsequently reacting the reaction product with mono- or binuclear bisphenols in the presence of a cyclic quaternary ammonium salt.

11 Claims, No Drawings

NOVEL EPOXY RESINS

The present invention relates to novel advanced epoxy resins which are espcially suitable for use as components of coating formulations, and to the products obtainable therefrom by curing.

The advancement of epoxy resins is generally understood to mean the reaction of an epoxy resin with a dihydroxy compound to effect chain lengthening.

The advancement of diepoxides with aliphatic diols is disclosed in U.S. Pat. No. 4,968,400. In a second step, the epoxy resin obtained is reacted with carboxylic acids carrying an additional primary hydroxyl group. The virtually epoxy-free, hydroxy-containing products are then used as starting components for the polymerisation of lactones to give graft copolymers. These compounds can be used as components of coating compositions.

A procss for the preparation of advanced epoxy resins having a low content of bound aliphatic halide is disclosed in U.S. Pat. No. 4,684,701. The process comprises reacting an epoxy resin with a polyphenol and an aliphatic alcohol in a single step in an inert solvent and in the presence of an alkali metal hydroxide as catalyst. Because the reaction is carried out in a single step it is only possible to control the ratio between the two alcohol components to a limited degree, as the more reactive aromatic hydroxyl component is preferably incorporated. It has been found that the amount of aliphatic alcohol component influences important parameters of the product in respect of coating properties, for example its viscosity, flexibility, adhesive strength, as well as the mechanical and chemical resistance of the cured product. These properties can only be partially optimised by means of the prior art process.

The structure and properties of the advanced products are generally influenced by the nature of the catalyst employed. A particularly important element here is the selectivity of the catalyst, which is a determining factor for the production of linear polyhydroxy ethers. The catalyst normally influences the relationship of the two mutually competing reactions between the epoxy groups of the resin to be advanced and the hydroxyl groups of the polyalcohol, or between the epoxy groups of the resin to be advanced and the secondary hydroxyl groups of the epoxy resin. This last mentioned reaction usually results in branched or partially crosslinked epoxy resins. Products in which this reaction proceeds partially have generally high viscosities and are therefore less desirable as components of coating compositions.

It has now been found that the shortcomings referred to above can be avoided by preparing advanced aromatic epoxy resins in a two-step reaction, in the presence of a selected catalyst, with minor amounts of aliphatic dihydroxy compounds and subsequently with specific aromatic dihydroxy compounds. Compared with advanced epoxy resins prepared without an aliphatic dihydroxy component, the products so obtained have a greatly reduced viscosity. It has further been found that the viscosity of these resins in general increases only insignificantly during hot storage, i.e. that virtually no build-up of the advanced epoxy resin takes place. Furthermore, the cured products obtainable from the resins of this invention have a surprisingly good resistance to chemicals and abrasion, as well as enhanced flexibility and adhesive strength.

The present invention relates to epoxy resins which are obtainable by an advancement reaction comprising the steps:

(a) reacting a liquid or semi-solid aromatic epoxy resin containing on average more than one epoxy group per molecule with about 2 to 30 equivalent percent, based on the amount of epoxy equivalents of the epoxy resin to be advanced, of an aliphatic diol, in the presence of a catalytic amount of a cyclic quaternary ammonium compound, and (b) reacting the product obtained in step (a) with about 30 to 95 equivalent percent, based on the epoxy resin to be advanced, of a bisphenol of formula I

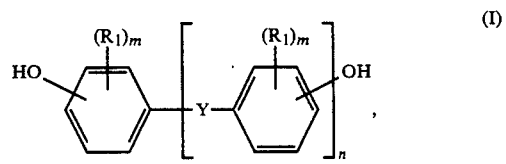

wherein m is 0, 1 or 2, n is 0 or preferably 1, $R_1$ is $C_1$-$C_8$alkyl, chloro or, preferably, bromo, and Y is a direct C—C bond or is a radical selected from the group consisting of —$CH_2$—, —$CHCH_3$—, —$C(CH_3)_2$—, —O—, —S— and —$SO_2$—.

The aromatic polyglycidyl compounds preferably employed may be ethers or esters. In addition, the glycidyl groups may also be attached to nitrogen atoms. It is most preferred to use diglycidyl compounds.

Illustrative examples of phenols from which the ethers are derived are: mononuclear diphenols such as resorcinol or hydroquinone, naphthalenes which carry two hydroxyl groups, such as 1,4-dihydroxynaphthalene, dihydroxybiphenyls and other binuclear aromatic compounds which contain a methylene. Isopropylidene, —O—, —S— or —$SO_2$ bridge and carry two hydroxyl groups attached to the aromatic nuclei, for example bis(hydroxyphenyl)methane (bisphenol F) and, more particularly, 2,2-bis(4-hydroxyphenyl)propane (bisphenol A) or the chlorinated or, preferably, brominated derivatives thereof, such as tetrabromobisphenol A.

The glycidyl esters are derived, for example, from aromatic dicarboxylic acids such as isophthalic acid or terephthalic acid.

Suitable epoxy compounds in which the glycidyl groups are attached to nitrogen atoms are preferably N-glycidyl compounds of aromatic amines. A typical example of such compounds is N,N-diglycidyl aniline.

The products in question are known per se and most are commercially available.

The expression "liquid or semi-solid aromatic epoxy resin containing on average more than one epoxy group per molecule" is known to the expert in the field of epoxy resins. Typical examples of preferred epoxy resins are the diglycidyl ethers based on bisphenol A. Among these resins, liquid resins have epoxy values of ca. 5 to 6 equivalents/kg and semi-solid resins have epoxy values of ca. 3 to 5 equivalents/kg.

Suitable aliphatic diols which may be used in the advancement reaction of this invention are generally all aliphatic compounds which carry in particular primary and/or secondary hydroxyl groups. Compounds carrying tertiary hydroxyl groups are less preferred, as their reactivity is normally too low. Particularly preferred are aliphatic compounds carrying two terminal primary hydroxyl groups.

Exemplary of aliphatic diols are alkylene glycols with straight or branched alkylene chain, typically ethylene glycol, 1,2-propanediol, 1,3-propanediol, 1,4-butanediol, 1,5-pentanediol, neopentyl glycol (2,2-dimethylpropanediol), 1,6-hexanediol, 1,8-octanediol, 1,10-decanediol, 1,12-dodecanediol, or polyalkylene glycols such as di- or triethylene glycol or higher poly(oxyethylene) glycols, or di- or tripropylene glycol or higher poly(oxypropylene) glycols, or di- or tributylene glycol or higher poly(oxybutylene) glycols.

Suitable compounds of formula I are mononuclear bisphenols such as resorcinol or hydroquinone or, preferably, binuclear bisphenols in which the hydroxyl groups are each preferably para-positioned to the bridge Y.

It is preferred to use bisphenols of formula I, wherein n is 1 and Y is —$CH_2$— and, preferably, —$C(CH_3)_2$—.

Preferred bisphenols of formula I are typically resorcinol, hydroquinone, 4,4'-dihydroxybiphenyl, bis(4-hydroxyphenyl)methane, bis(4-hydroxyphenyl ether, bis(4-hydroxyphenyl)sulfide, bis(4-hydroxyphenyl)sulfone and, preferably, 2,2-bis(4-hydroxyphenyl)propane or the chlorinated or brominated derivatives thereof, such as tetrabromobisphenol A.

It is also possible to use mixtures of the cited diols as well as mixtures of bisphenols of formula I.

The cyclic quaternary ammonium compound used for catalysing the advancement reaction is preferably a quaternary pyrrolidinium salt, a quaternary morpholinium salt or, most preferably, a quaternary piperidinium salt.

Such compounds are in particular the compounds of formula II, III or IV

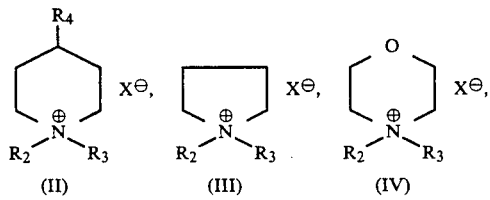

wherein $R_2$ is $C_1$–$C_8$-alkyl and $R_3$ is $C_1$–$C_8$alkyl, $C_2$–$C_8$hydroxyalkyl, $C_3$–$C_8$alkoxyhydroxyalkyl, $C_3$–$C_8$alkenyl, $C_3$–$C_8$alkoxycarbonylalkyl, $C_3$–$C_8$alkylcarbonylalkyl, $C_7$–$C_9$phenylalkyl or $C_7$–$C_9$phenylhydroxyalkyl, $R_4$ is hydrogen or hydroxyl, and X is halogen or acetate.

Suitable piperidinium salts are preferably compounds which conform to formula II defined above, wherein $R_2$ is $C_1$–$C_8$alkyl, $R_3$ is $C_1$–$C_8$alkyl, $C_2$–$C_8$hydroxyalkyl or benzyl, $R_4$ is hydrogen, and X is halogen or acetate.

Suitable pyrrolidinium salts are preferably compounds which conform to formula III defined above, wherein $R_2$ is $C_1$–$C_8$alkyl, $R_3$ is $C_1$–$C_8$alkyl, $C_2$–$C_8$hydroxyalkyl or benzyl, and X is halogen or acetate.

Suitable morpholinium salts are preferably compounds which conform to formula IV defined above, wherein $R_2$ is $C_1$–$C_8$alkyl, $R_3$ is $C_1$–$C_8$alkyl, $C_2$–$C_8$hydroxyalkyl or benzyl, and X is bromo or iodo.

$C_1$–$C_8$Alkyl, preferably $C_1$–$C_4$alkyl, may suitably be branched or preferably straight-chain groups. Such groups are typically methyl, ethyl, n-propyl, n-butyl, n-hexyl or n-octyl.

$C_2$–$C_8$Hydroxyalkyl, preferably $C_2$–$C_3$hydroxyalkyl, may suitably be groups containing branched or preferably straight-chain alkylene radicals. Such radicals ae typically 2-hydroxyethyl, 2-hydroxypropyl or 2-hydroxybutyl.

$C_3$–$C_8$-Alkoxyhydroxyalkyl denotes radicals which contain an ether function as well as a hydroxyl group, for example (2-hydroxy-3-butoxy)propyl.

$R_3$ as $C_3$–$C_8$alkenyl denotes radicals whose double bond is not in conjugation to the nitrogen atom. Such radicals are typically allyl or methallyl.

$C_3$–$C_8$Alkoxycarbonylalkyl denotes groups containing branched or preferably straight-chain alkyl and alkylene radicals. Examples of such groups are 2-methoxycarbonylethyl or 2-ethoxycarbonylethyl.

$C_3$–$C_8$Alkylcarbonylalkyl denotes groups containing branched or preferably straight-chain alkyl and alkylene radicals. Examples of such groups are 2-methylcarbonylethyl or 2-ethylcarbonylethyl.

$C_7$–$C_9$Phenylalkyl groups are typically benzyl or phenylethyl.

$C_7$–$C_9$Phenylhydroxyalkyl is typically (2-hydroxy-2-phenyl)ethyl.

X as halogen is preferably I, Br or Cl, preferably I or Br and, most preferably, I.

The compounds of formulae II, III and IV are known per se and can be prepared in conventional manner, for example by reacting a piperidine of formula IIa, a pyrrolidine of formula IIIa or a morpholine of formula IVa with a compound $R_3$-X

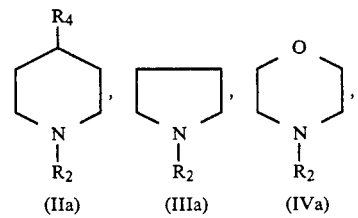

wherein $R_2$, $R_3$, $R_4$ and X are as defined above. Attention is drawn to the Examples regarding further particulars relating to the preparation of the compounds of formulae II, III and IV.

The total amount of diol component used for the advancement reaction will depend on what type of product is desired. The greater the amount is, the higher the molecular weight of the final product will generally be. The softening point will also rise and the epoxy value of the resin obtained will decrease.

The products of this invention will normally have an epoxy value ranging from 0.1 to 2.5 equivalents/kg. The epoxy value of the final product can be controlled in a manner known per se via the total amount of diol component used in the advancement reaction.

About 95 to 70 mol % thereof, based on the total amount of diol component, will consist of bisphenol of formula I, whereas about 5 to 30 mol % of the diol component will consist of an aliphatic diol. These proportions or total amounts are obtained by using the diol components in the equivalent percentage amounts as defined above, based on the epoxide equivalents.

The amount of aliphatic diol component is preferably 5 to 20 mol %, based on the total amount of diol component.

The advancement reaction is carried out in two steps. In the first step, the resin is reacted almost quantitatively with the desired amount of aliphatic dihydroxy compound, which is less reactive than the bisphenol. In the second step, this intermediate, preferably without being isolated, is reacted with the more reactive bisphenol component until the epoxy value of the desired type of resin is reached.

The reaction may be carried out in the presence, or preferably in the absence, of a solvent which is inert under the reaction conditions. Illustrative examples of inert solvents are aliphatic ketones such as methyl ethyl ketone, aromatic hydrocarbons such as toluene or xylene, halogenated aromatic hydrocarbons such as dichlorobenzene, or aliphatic ethers such as dimethyl ether or diethylene glycol.

The cyclic quaternary ammonium salt which may suitably be used in the process of this invention is added in catalytic amounts, for example in an amount of ca. 10 to 5000, preferably from 500 to 3000 and, most preferably, from 600 to 2400 ppm, based on the weight of the basic resin.

The reaction is normally carried out in the temperature range from 140° to 220° C., preferably from 160° to 200° C. and, most preferably, at ca. 180° C.

The reaction may be carried out in the air or in an inert gas atmosphere, for example under nitrogen or argon. The pressure is normally from 10 to 3000 mbar, preferably 10 to 600 mbar.

If required, additional cyclic quaternary ammonium salt may be added in the second step.

The bisphenol of formula I may be added in one portion or in several portions.

The final product has a surprisingly low viscosity. The viscosity values are usually from 100 to 5000 mPa.s, preferably from 100 to 2500 mPa.s (measured according to DIN 53 015 as 40% solution in butyl carbitol at 25° C.), depending on the molecular weight of the resin obtained.

Preferred resins of this invention can be obtained by advancing liquid diglycidyl ethers based on bisphenol A with 2 to 30 equivalent percent, based on the amount of epoxide equivalents employed, of $\alpha,\omega$-alkylene glycols containing 2 to 6 carbon atoms, or of polyethylene glycol, preferably diethylene glycol, in the presence of 600 to 2400 ppm, based on the amount of liquid diglycidyl ether, of a quaternary pyrrolidinium salt, morpholinium salt or, preferably, piperidinium salt, and subsequently reacting the advanced product with 30 to 95 equivalent percent, based on the amount of epoxide equivalents employed, of bisphenol A, bisphenol F, tetrabromobisphenol A or with a mixture of these phenols.

In this preferred reaction, the process is carried out in the temperature range from 160° to 200° C., preferably at ca. 180° C., and under a pressure of 10 to 600 mbar.

Particularly preferred resins of this invention are obtainable by advancing, at a temperature of ca. 180° C., liquid diglycidyl ethers based on bisphenol A with 3 to 19 equivalent percent, based on the amount of epoxide equivalents employed, of 1,4-butanediol or of diethylene glycol, in the presence of ca. 600 to 1200 ppm, based on the amount of liquid diglycidyl glycol, of N-ethyl-N-methylpiperidinium iodide, and subsequently reacting the advanced product with 45 to 61 equivalent percent, based on the amount of epoxide equivalents employed, of bisphenol A. The resultant final product has an epoxy value of ca. 1.20 to 1.40 equivalents/kg.

Further particularly preferred resins of this invention are obtainable by advancing, at a temperature of ca. 180° C., liquid diglycidyl ethers based on bisphenol A with 4 to 25 equivalent percent, based on the amount of epoxide equivalents employed, of 1,4-butanediol or of diethylene glycol, in the presence of ca. 1200 to 2400 ppm, based on the amount of liquid diglycidyl glycol, of N-ethyl-N-methylpiperidinium iodide, and subsequently reacting the advanced product with 57 to 78 equivalent percent, based on the amount of epoxide equivalents employed, of bisphenol A. The resultant final product has an epoxy value of ca. 0.45 to 0.60 equivalents/kg.

Still further particularly preferred resins of this invention are obtainable by advancing, at a temperature of ca. 180° C., liquid diglycidyl ethers based on bisphenol A with 4 to 26 equivalent percent, based on the amount of epoxide equivalents employed, of 1,4-butanediol or of diethylene glycol, in the presence of ca. 1200 to 1500 ppm, based on the amount of liquid diglycidyl glycol, of N-ethyl-N-methylpiperidinium iodide, and subsequently reacting the advanced product with 62 to 84 equivalent percent, based on the amount of epoxide equivalents employed, of bisphenol A. The resultant final product has an epoxy value of ca. 0.34 to 0.43 equivalents/kg.

The advanced epoxy resins so obtained are distinguished by the high stability of their epoxy value and viscosity when subjected to heat. Furthermore, the resins have a low viscosity which is useful for further processing. Exceedingly linear products are obtained owing to the constant activity and the remarkable selectivity of the advancement catalysts employed. In general, the use of a monofunctional chain terminator, for example a monofunctional phenol, can be dispensed with. If desired, however, such a chain terminator may be used in the reaction.

The products of this invention also have good colour properties, especially in conjunction with phenol hardeners.

The epoxy resins of this invention can be converted into crosslinked products by reaction with conventional curing agents such as acid anhydrides, polyamines or polyhydric phenols. Cold-setting and hot-setting curing agents can be used. The cured final products have, surprisingly, excellent resistance to chemicals and excellent abrasion resistance, and they also have enhanced flexibility and adhesive strength.

Accordingly, the invention also relates to the cured products which are obtainable by reacting the advanced epoxy resins of this invention with a per se known curing agent.

The advanced epoxy resins of this invention can be used in particular for surface protection, for the fabrication of castings or of prepregs and laminates.

The use of the advanced epoxy resins of this invention as solid resin components for the preparation of high-solids coating compositions, as components of powder coating compositions, or as components of can- and tube-lining resins. The invention also further relates to the use of the epoxy resins for the above purposes.

The invention is illustrated by the following Examples.

I. PREPARATION OF THE CATALYST

I.1. Preparation of N-methyl-N-ethylpiperidinium iodide

The following substances are mixed in the same order in a 1000 ml flask with ground glass joints 40.7 ml of ethyl iodide (05 mol),
180 ml of methyl ethyl ketone (MEK), 62.0 ml of N-methylpiperidine (0.5 mol).

The flask is heated on a rotary evaporator for ca. 4 hours to 65° C., and then the precipitated product is filtered with suction, washed briefly, and dried. The yield is 119 g (=93%). The melting point is 304° C.

II. PREPARATION OF THE ADVANCED EPOXY RESINS

II.1. General synthesis procedure

With stirring, 4.55 epoxide equivalents of a liquid epoxy resin, 3–18 equiv. %, based on the equivalents of the epoxy resin employed, of an aliphatic dihydroxy compound, and 600-2 400 ppm of catalyst (5% solution in butanol), based on the amount of epoxy resin, are heated to 180° C. until the epoxy value shows a quantitative reaction of the epoxy resin with the aliphatic dihydroxy compound. Then 49–78 equiv. %, based on the equivalents of the epoxy resin employed, of aromatic dihydroxy compound is added in one or more portions, while waiting meanwhile until the temperature has again reached 180° C. When the temperature has again risen to 180° C. after addition of the last portion of aromatic dihydroxy compound, a slight vacuum (ca. 500 mbar) is applied, and stirring is continued until the epoxy value of the desired type of resin is reached. The resin is then discharged and allowed to cool.

II.2. EXAMPLES 1-16:

Preparation of advanced epoxy resins, starting from liquid diglycidyl ether based on bisphenol A (epoxy value: ca. 5.4 eq./kg), diethylene glycol (DEG) or 1,4-butanediol (BUD) and bisphenol A; catalyst: N-ethyl-N-methylpiperidinium iodide.

The reaction specifications and results are listed in Tables 1–3. The amounts of DEG, BUD and bisphenol A as well as the total amount of hydroxy compounds are given in equiv. %, based on the amount of epoxy resin employed.

II.3. EXAMPLES 17-22:

Preparation of advanced epoxy resins, starting from liquid diglycidyl ethers based on bisphenol A (epoxy value ca. 5.4 equ/kg), 1,4-butanediol, 1,6-hexanediol, triethylene glycol and 2-butene-1,4-diol, cis, with bisphenol A or with a mixture of bisphenol A and bisphenol S. Catalysts:

N-ethyl-N-methylpiperidinium iodide,
N,N-dimethylmorpholinium chloride,
N,N-diethylpyrrolidinium iodide.

The reaction specifications and results are given in Table 4. The amounts of aliphatic diol and the amounts of bisphenol A and S and the total amopunts of the hydroxy compounds are indicated in eq. %, based on the amount of epoxy resin employed.

TABLE 1

| | Examples 1-6 (epoxy resins with epoxy numbers from 1.26 to 1.42 eq./kg) | | | | | | | | | | |
|---|---|---|---|---|---|---|---|---|---|---|---|
| | SPECIFICATION | | | | RESULTS | | | | | | |
| Example | Cat. conc. [ppm] | DEG [eq. %] | BUD [eq. %] | Bisphenol A [eq. %] | Total hydroxy components [eq. %] | Epoxy value [eq./kg] blank/thermo [1] | Epoxy stabil. [%] | Viscosity [2] [mPa.s] blank/thermo [1] | Build-up factor | Softening point [°C.] [3] | Colour value (Gardner) | Reaction time [h] |
| 1 | 600 | 3.1 | — | 60.9 | 64.0 | 1.39/1.30 | 94 | 400/500 | 1.3 | 92 | 4 | 5.75 |
| 2 | 600 | — | 3.1 | 60.9 | 64.0 | 1.35/1.26 | 93 | 420/510 | 1.2 | 92 | 3–4 | 7.0 |
| 3 | 1200 | 6.2 | — | 55.8 | 62.0 | 1.38/1.31 | 95 | 350/370 | 1.1 | 84 | 2–3 | 5.1 |
| 4 | 1200 | — | 6.2 | 55.8 | 62.0 | 1.42/1.33 | 94 | 325/365 | 1.1 | 84 | 2 | 4.2 |
| 5 | 1200 | 12.3 | — | 49.7 | 62.0 | 1.41/1.28 | 91 | 280/320 | 1.1 | 78 | 2 | 7.0 |
| 6 | 1200 | — | 12.3 | 49.7 | 62.0 | 1.36/1.27 | 93 | 270/320 | 1.2 | 77 | 2 | 6.75 |

[1] "blank" value measured directly after the advancement reaction; "thermo" value: measured after storage for 4 hours at 180° C.
[2] measured at 25° C., 40% in butyl carbitol, acc. to DIN 53015
[3] acc. to DIN 51920 (Mettler)

TABLE 2

| | Examples 7-12 (epoxy resins with epoxy numbers from 0.45 to 0.59 eq./kg) | | | | | | | | | | |
|---|---|---|---|---|---|---|---|---|---|---|---|
| | SPECIFICATION | | | | RESULTS | | | | | | |
| Example | Cat. conc. [ppm] | DEG [eq. %] | BUD [eq. %] | Bisphenol A [eq. %] | Total hydroxy components [eq. %] | Epoxy value [eq./kg] blank/thermo [1] | Epoxy stabil. [%] | Viscosity [2] [mPa.s] blank/thermo [1] | Build-up factor | Softening point [°C.] [3] | Colour value (Gardner) | Reaction time [h] |
| 7 | 1200 | 8.1 | — | 74.1 | 82.2 | 0.59/0.52 | 88 | 1210/1760 | 1.5 | 111 | 2–3 | 6 |
| 8 | 1200 | — | 8.1 | 73.4 | 81.5 | 0.59/0.52 | 88 | 1170/1600 | 1.4 | 113 | 2–3 | 7 |
| 9 | 1200 | 16.2 | — | 65.3 | 81.5 | 0.59/0.54 | 92 | 970/1170 | 1.2 | 105 | 2–3 | 10.5 |
| 10 | 1200 | — | 16.2 | 65.3 | 81.5 | 0.59/0.50 | 85 | 720/960 | 1.3 | 102 | 3–4 | 11.0 |
| 11 | 2400 | 16.2 | — | 65.3 | 81.5 | 0.54/0.45 | 83 | 790/950 | 1.2 | 101 | 4 | 8.25 |
| 12 | 2400 | — | 16.2 | 65.3 | 81.5 | 0.54/0.45 | 83 | 950/1040 | 1.1 | 106 | 4 | 10.5 |

[1] "blank" value measured directly after the advancement reaction; "thermo" value: measured after storage for 4 hours at 180° C.
[2] measured at 25° C., 40% in butyl carbitol, acc. to DIN 53015
[3] acc. to DIN 51920 (Mettler)

TABLE 3

Examples 13-16 (epoxy resins with epoxy numbers from 0.34 to 0.43 eq./kg)

| Example | SPECIFICATION | | | | | RESULTS | | | | | |
|---|---|---|---|---|---|---|---|---|---|---|---|
| | Cat. conc. [ppm] | DEG [eq. %] | BUD [eq. %] | Bis-phenol A [eq. %] | Total hydroxy components [eq. %] | Epoxy value [eq./kg] blank/thermo [1] | Epoxy stabil. [%] | Viscosity [2] [mPa.s] blank/thermo [1] | Build-up factor | Soft-ening point [°C.] [3] | Colour value (Gardner) | Reaction time [h] |
| 13 | 1200 | 8.6 | — | 78.0 | 86.6 | 0.43/0.37 | 87 | 1875/2500 | 1.3 | 123 | 3-4 | 8.1 |
| 14 | 1200 | 17.4 | — | 69.2 | 86.6 | 0.43/0.40 | 94 | 1700/1870 | 1.1 | 116 | 5 | 15.5 |
| 15 | 1500 | — | 8.6 | 78.0 | 86.6 | 0.43/0.34 | 80 | 1700/2500 | 1.5 | 117 | 3 | 5.3 |
| 16 | 1500 | — | 17.4 | 69.2 | 86.6 | 0.41/0.34 | 83 | 1100/1500 | 1.4 | 105 | 3-4 | 8.8 |

[1] "blank" value measured directly after the advancement reaction;
"thermo" value: measured after storage for 4 hours at 180° C.
[2] measured at 25° C., 40% in butyl carbitol, acc. to DIN 53015
[3] acc. to DIN 51920 (Mettler)

TABLE 4

Examples 17-22 (epoxy resins with epoxy numbers from 1.26 to 0,59 eq./kg)

| Example | SPECIFICATION | | | | RESULTS | | | | | | |
|---|---|---|---|---|---|---|---|---|---|---|---|
| | Cat./Cat. Conc. [ppm] | Diol [eq. %] | Bis-phenol A [Aequ. %] | Total hydroxy components [Aequ. %] | Epoxy value [eq./kg] blank/thermo [1] | Epoxy stabil. [%] | Viscosity [2] [mPa.s] blank/thermo [1] | Build-up factor | Soft-ening point [°C.] [3] | Colour value (Gardner) | Reaction time [h] |
| 17 | (a)/1200 | 8,2 1,4-butanediol | A: 73.3 | 81.5 | 0.59/0.53 | 90 | 1640/2470 | 1.5 | 121 | 2-3 | 5.2 |
| 18 | (b)/1200 | 8,2 1,4-butanediol | A: 73.3 | 81.5 | 0.60/0.54 | 90 | 1240/1500 | 1.2 | 116 | 2-3 | 6.5 |
| 19 | (c)/1200 | 8,2 1,4-hexanediol | A: 73.3 | 81.5 | 0.59/0.53 | 90 | 1430/1800 | 1.3 | 116 | 2-3 | 5.8 |
| 20 | (d)/1200 | 8,2 triethylene glycol | A: 73.3 | 81.5 | 0.59/0.54 | 92 | 1370/1780 | 1.3 | 114 | 2-3 | 6.3 |
| 21 | (e)/2400 | 8,2 2-butene-1,4-diol cis | A: 73.3 | 81.5 | 0.59/0.52 | 88 | 1280/1750 | 1.4 | 116 | 3 | 5.3 |
| 22 | (f)/2400 | 8,2 2-butene-1,4-diol cis | A:56,9 S:16.4 | 81.5 | 0.55/0.45 | 82 | 1870/3000 | 1.6 | 126 | 3-4 | 4.0 |

[1] "blank" value measured directly after the advancement reaction;
"thermo" value: measured after storage for 4 hours at 180° C.
[2] measured at 25° C., 40% in butyl carbitol, acc. to DIN 53015
[3] acc. to DIN 51920 (Mettler)
(a): N,N-dimethylmorpholinium chloride
(b): N,N-diethylpyrrolidinium iodide
(c) = (d) = (e) = (f): N-ethyl-N-methylpiperidinium iodide

III. TEST OF THE RESIN COATING PROPERTIES

III.1. Examples 1-6

Formulation: 50 parts by weight of resin are dissolved hot in 50 parts by weight of 1-methoxy-2-propylacetate, and 9.8 parts by weight of an anhydride hardener (3.2-3.8 eq./kg) in 14.7 parts by weight of cyclohexanone and 0.27 part by weight of a levelling agent (silicone oil L050, 10% in toluene) are added. The formulation is then adjusted to a viscosity of ca. 70 seconds (DIN 4 mm beaker) with 1-methoxy-2-propylacetate. The lacquer is applied with a doctor blade applicator to metal sheets (aluminium or tin plate) and then stoved for 10 minutes at 200° C. The layer thickness for can manufacture is 6 μm. The results are summarised in Table 5.

III.2. EXAMPLES 7-12

The procedure of III.1 is repeated, using 4 parts by weight of an anhydride hardener (3.2-3.8 eq./kg) in 6 parts by weight of cyclohexanone. The layer thickness is 20-25 μm, in can/cup manufacture 6 μm. The results are summarised in Table 6.

III.3. EXAMPLES 13-16

The procedure of III.1 is repeated, using 2.7-3.1 parts by weight of an anhydride hardener (3.2-3.8 eq./kg) in 4.1-4-6 parts by weight of cyclohexanone and 50 parts by weight of resin in 70 parts by weight of 1-methoxy-2-propylacetate. The layer thickness is 20-25 μm, in can/cup manufacture 6 μm. The results are summarised in Table 7.

III.4. EXAMPLES 17-22

The procedure of III.2 is repeated. The layer thickness is 20-25 μm, in can/cup manufacture 6 μm. The results are summarised in Table 8.

TABLE 5

Examples 1-6 Can manufacture

| Example | Alu | TP | Example | Alu | TP |
|---|---|---|---|---|---|
| 1 | 3 | 3 | 2 | 3 | 3 |
| 3 | 3 | 2-3 | 4 | 3 | 3 |
| 5 | 3 | 2 | 6 | 3 | 2 |

TABLE 6

Coating properties (Example 7-12)

| Test | Example 7 | | Example 8 | | Example 11 | | Example 12 | |
|---|---|---|---|---|---|---|---|---|
| | Alu | TP | Alu | TP | Alu | TP | Alu | TP |
| square-cut adhesion test [rating] | 0 | — | 0 | — | 1 | — | 0 | 13 |
| flexural test ∅ mm | 1 | — | 1 | — | 1 | — | 1 | — |
| Erichsen test/ | 3.7 | — | 9.4 | — | 9.4 | — | 9.2 | — |

TABLE 6-continued

Coating properties (Example 7-12)

| Test | Example 7 Alu | 7 TP | 8 Alu | 8 TP | 11 Alu | 11 TP | 12 Alu | 12 TP |
|---|---|---|---|---|---|---|---|---|
| DIN 53156 [rating] | | | | | | | | |
| impact test [rating] | 0 | — | 0 | — | 4 | — | 4 | — |
| acetone rubbing test [rating] | 3 | — | 3 | — | 3 | — | 3 | — |
| cup drawing [rating] | 0 | 0 | — | — | — | — | — | — |
| beading [rating] | 0 | 0 | — | — | — | — | — | — |
| can manufacture [rating] | 2 | 1(0) | 2 | 1 | 2(1) | 1(0) | 2 | 1(0) |

Alu: Aluminium
TP: tin plate
Rating acc. to DIN 53230

TABLE 7

Coating properties (Examples 13-16)

| Test | 13 Alu | 13 TP | 15 Alu | 15 TP | 16 Alu | 16 TP |
|---|---|---|---|---|---|---|
| square-cut adhesion test [rating] | 0 | — | 0 | — | 0 | — |
| flexural test ∅ mm | >3 | — | >3 | — | >3 | — |
| Erichsen test/DIN 53156 [rating] | 9.3 | — | 4.7 | — | 2.5 | — |
| impact test [rating] | 4 | — | 4 | — | 5 | — |
| acetone rubbing test [rating] | 3 | — | 3 | — | 4 | — |
| cup drawing [rating] | — | — | — | — | — | — |
| beading [rating] | — | — | — | — | — | — |
| can manufacture [rating] | 1(0) | 0 | 0 | 0 | 1(0) | 0 |

Alu: Aluminium
TP: tin plate
Rating acc. to DIN 53230

TABLE 8

Coating properties (Examples 17-22)

| Test | 17 Alu | 17 TP | 18 Alu | 18 TP | 19 Alu | 19 TP | 20 Alu | 20 TP | 21 Alu | 21 TP | 22 Alu | 22 TP |
|---|---|---|---|---|---|---|---|---|---|---|---|---|
| square-cut adhesion test [rating] | 0 | — | 0 | — | 0 | — | 0 | — | 0 | — | 0 | — |
| flexural test ∅ mm | 1 | — | 1 | — | 1 | — | 1 | — | 1 | — | 1 | — |
| Erichsen test/DIN 53156 [rating] | 10.0 | — | 10.0 | — | 10.4 | — | 10.5 | — | 10.4 | — | 9.7 | — |
| impact test [rating] | 0 | — | 0 | — | 0 | — | 0 | — | 0 | — | 0 | — |
| acetone rubbing test [rating] | 3 | — | 3 | — | 3 | — | 3 | — | 3 | — | 3 | — |
| cup drawing [rating] | 0 | 0 | 0 | 0 | 0 | 0 | 0 | 0 | 0 | 0 | 0 | 0 |
| beading [rating] | 0 | 0 | 0 | 0 | 0 | 0 | 0 | 0 | 0 | 0 | 0 | 0 |
| can manufacture [rating] | 2 | 1 | 1 | 0 | 2 | 1 | 2 | 1 | 2 | 1 | 2 | 1 |

Alu: Aluminium
TP: tin plate
Rating acc. to DIN 53230

What is claimed is:

1. An epoxy resin which is obtainable by an advancement reaction comprising the steps:
   (a) reacting a liquid or semi-solid aromatic epoxy resin containing on average more than one epoxy group per molecule with about 2 to 30 equivalent percent, based on the amount of epoxy equivalents of the epoxy resin to be advanced, of an aliphatic diol, in the presence of a catalytic amount of a cyclic quaternary ammonium compound, and
   (b) reacting the product obtained in step (a) with about 30 to 95 equivalent percent, based on the epoxy resin to be advanced, of a bisphenol of formula I

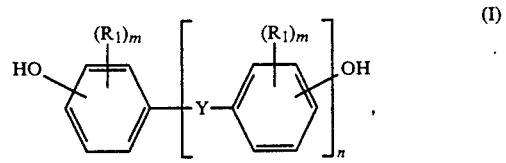

wherein m is 0, 1 or 2, n is 0 or preferably 1, $R_1$ is $C_1$-$C_8$alkyl, chloro or, preferably, bromo, and Y is a direct C—C bond or is a radical selected from the group consisting of —$CH_2$—, —$CHCH_3$—, —$C(CH_3)_2$—, —O—, —S— and —$SO_2$—.

2. An advanced epoxy resin according to claim 1, wherein the liquid or semi-solid aromatic epoxy resin containing on average more than one epoxy group per molecule is a diglycidyl ether based on bisphenol A which has an epoxy value of ca. 3 to 6 equivalents/kg.

3. An advanced epoxy resin according to claim 1, wherein the diol component used for the advancement reaction is an aliphatic compound carrying two primary hydroxyl groups.

4. An advanced epoxy resin according to claim 1, wherein the bisphenol of formula I is selected from the group consisting of resorcinol, hydroquinone, 4,4'-dihydroxybiphenyl, bis(4-hydroxyphenyl)methane, bis(4-hydroxyphenyl ether, bis(4-hydroxyphenyl)sulfide, bis(4-hydroxyphenyl)sulfone and, preferably, 2,2-bis(4-hydroxyphenyl)propane or a chlorinated or brominated derivative thereof, preferably tetrabromobisphenol A.

5. An advanced epoxy resin according to claim 1, wherein the cyclic quaternary ammonium compound used for catalysing the advancement reaction is a quaternary pyrrolidinium salt, a quaternary morpholinium salt or, preferably, a quaternary piperidinium salt.

6. An advanced epoxy resin according to claim 5, wherein the cyclic quaternary ammonium compound used for catalysing the advancement reaction is a compound of formula II, III or IV

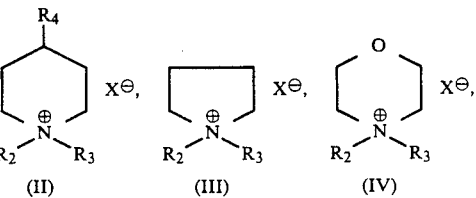

wherein $R_2$ is $C_1$-$C_8$-alkyl and $R_3$ is $C_1$-$C_8$alkyl, $C_2$-$C_8$-hydroxyalkyl, $C_3$-$C_8$alkoxyhydroxyalkyl, $C_3$-$C_8$alkenyl, $C_3$-$C_8$alkoxycarbonylalkyl, $C_3$-$C_8$alkylcarbonylalkyl, $C_7$-$C_9$phenylalkyl or $C_7$-$C_9$phenylhydroxyalkyl, $R_4$ is hydrogen or hydroxyl ist, and X is halogen or acetate.

7. An advanced epoxy resin according to claim 1, which is obtainable by advancing, at a temperature in the range from 160° to 200° C. and under a pressure of 10 to 600 mbar, a liquid diglycidyl ether based on bisphenol A with 2 to 30 equivalent percent, based on the amount of epoxide equivalents employed, of an $\alpha,\omega$-alkylene glycol containing 2 to 6 carbon atoms, or of an polyethylene glycol, preferably diethylene glycol, in the presence of 600 to 2 400 ppm, based on the amount of liquid diglycidyl ether, of a quaternary pyrrolidinium, morpholinium or, preferably, piperidinium salt, and subsequently reacting the advanced product with 30 to 95 equivalent percent, based on the amount of epoxide equivalents employed, of bisphenol A, bisphenol F, tetrabromobisphenol A, or with a mixture of these phenols.

8. An advanced epoxy resin according to claim 1, which is obtainable by advancing, at a temperature of ca. 180° C., a liquid diglycidyl ether based on bisphenol A with 3 to 19 equivalent percent, based on the amount of epoxide equivalents employed, of 1,4-butanediol or of diethylene glycol, in the presence of ca. 600 to 1200 ppm, based on the amount of liquid diglycidyl ether, of N-ethyl-N-methylpiperidinium iodide, and subsequently reacting the advanced product with 45 to 61 equivalent percent, based on the amount of epoxide equivalents employed, of bisphenol A.

9. An advanced epoxy resin according to claim 1, which obtainable by advancing, at a temperature of ca. 180° C., a liquid diglycidyl ether based on bisphenol A with 4 to 25 equivalent percent, based on the amount of epoxide equivalents employed, of 1,4-butanediol or of diethylene glycol, in the presence of ca. 1200 to 2400 ppm, based on the amount of liquid diglycidyl ether, of N-ethyl-N-methylpiperidinium iodide, and subsequently reacting the advanced product with 57 to 78 equivalent percent, based on the amount of epoxide equivalents employed, of bisphenol A.

10. An advanced epoxy resin according to claim 1, which is obtainable by advancing, at a temperature of ca. 180° C., a liquid diglycidyl ether based on bisphenol A with 4 to 26 equiv. %, based on the amount of epoxide equivalents employed, of 1,4-butanediol or of diethylene glycol, in the presence of ca. 1200 to 1500 ppm, based on the amount of liquid diglycidyl ether, of N-ethyl-N-methylpiperidinium iodide, and subsequently reacting the advanced product with 62 to 84 equivalent percent, based on the amount of epoxide equivalents employed, of bisphenol A.

11. A process for the preparation of cured products using advanced epoxy resins according to claim 1.

* * * * *